US012583437B2

(12) United States Patent
Hattar et al.

(10) Patent No.: US 12,583,437 B2
(45) Date of Patent: Mar. 24, 2026

(54) COLD START CONTROL SYSTEMS AND METHODS

(71) Applicant: GM GLOBAL TECHNOLOGY OPERATIONS LLC, Detroit, MI (US)

(72) Inventors: Rafat F. Hattar, Royal Oak, MI (US); Chengke Liu, Novi, MI (US); Sergio Quelhas, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 119 days.

(21) Appl. No.: 18/753,186

(22) Filed: Jun. 25, 2024

(65) Prior Publication Data

US 2025/0388205 A1 Dec. 25, 2025

(51) Int. Cl.
| | |
|---|---|
| *F02D 41/00* | (2006.01) |
| *B60W 10/06* | (2006.01) |
| *B60W 10/08* | (2006.01) |
| *B60W 20/15* | (2016.01) |
| *B60W 50/035* | (2012.01) |

(52) U.S. Cl.
CPC ............ *B60W 20/15* (2016.01); *B60W 10/06* (2013.01); *B60W 10/08* (2013.01); *B60W 50/035* (2013.01); *F02D 41/0087* (2013.01); *B60W 2510/244* (2013.01); *B60W 2540/10* (2013.01); *B60W 2540/12* (2013.01); *F02D 2200/0414* (2013.01); *F02D 2200/602* (2013.01)

(58) Field of Classification Search
CPC ............. F02D 41/1494; F02D 41/1454; F02D 2400/14; F02D 35/0015; B60W 10/06; B60W 20/00; B60W 2510/244

USPC ......................................................... 123/362
See application file for complete search history.

(56) References Cited

U.S. PATENT DOCUMENTS

2003/0213795 A1* 11/2003 Toyoda ............... F02D 41/1494
219/490
2007/0204840 A1 9/2007 Abe
(Continued)

FOREIGN PATENT DOCUMENTS

| CN | 109324602 A | 2/2019 |
|---|---|---|
| DE | 102011013402 A1 | 9/2011 |

(Continued)

OTHER PUBLICATIONS

German Office Action from counterpart DE1020241235187, dated Jan. 22, 2025.

*Primary Examiner* — Hung Q Nguyen
*Assistant Examiner* — James J Kim

(57) ABSTRACT

A system includes: a motor control module and an engine control module, where, when a temperature of an oxygen sensor in an exhaust system of an engine is less than a predetermined temperature while the engine is off: the motor control module is configured to apply power to an electric motor based on a driver torque request and drive rotation of a crankshaft; the engine control module is configured to, while the motor control module is applying power to the electric motor based on the driver torque request, not fuel the engine and not apply power to the oxygen sensor until a predetermined mass of air has flowed into the engine; and once the predetermined mass of air has flowed into the engine, the engine control module is configured to (a) apply power to the oxygen sensor and heat the oxygen sensor and (b) selectively start fueling the engine.

20 Claims, 4 Drawing Sheets

(56) References Cited

U.S. PATENT DOCUMENTS

| 2018/0170288 A1* | 6/2018 | Ferrara | F02M 35/16 |
| 2018/0274469 A1* | 9/2018 | Glugla | F02D 41/0245 |
| 2019/0242320 A1 | 8/2019 | Aoki et al. | |
| 2020/0172080 A1* | 6/2020 | Ahn | F02D 35/0015 |

FOREIGN PATENT DOCUMENTS

| JP | 2003269231 A | 9/2003 |
| JP | 2008256707 A | 10/2008 |
| KR | 19980025496 A | 7/1998 |

* cited by examiner

COLD START CONTROL SYSTEMS AND METHODS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to hybrid vehicles and more particularly to systems and methods for minimizing cold start emissions of an internal combustion engine of a hybrid vehicle.

Vehicles with an engine include a battery for starting the engine and supporting accessory loads. Electric vehicles (EVs) such as battery electric vehicles (BEVs), hybrid vehicles, and/or fuel cell vehicles include one or more electric machines and a battery system including one or more battery cells, modules and/or packs to provide propulsion power. A power control system is used to control power to/from the battery system during charging, propulsion and/or regeneration.

Lithium-ion batteries (LIBs) have high power density and are used in EV and non-EV applications. LIBs include anode electrodes, cathode electrodes and separators. The anode electrodes include active material arranged on opposite sides of a current collector. The cathode electrodes include cathode active material arranged on opposite sides of a current collector.

SUMMARY

In a feature, a motor and engine control system for a vehicle includes: a driver torque request module configured to determine a driver torque request based on driver input; a motor control module configured to selectively control application of power from a battery to an electric motor of the vehicle based on the driver torque request; an engine control module configured to selectively actuate actuators of an engine of the vehicle based on the driver torque request, where, when a temperature of an oxygen sensor in an exhaust system of the engine is less than a predetermined temperature while the engine is off: the motor control module is configured to apply power to the electric motor based on the driver torque request and drive rotation of a crankshaft of the engine; the engine control module is configured to, while the motor control module is applying power to the electric motor based on the driver torque request and driving rotation of a crankshaft of the engine, not fuel the engine and not apply power to the oxygen sensor until a predetermined mass of air has flowed into the engine; and once the predetermined mass of air has flowed into the engine, the engine control module is configured to (a) apply power to the oxygen sensor and heat the oxygen sensor and (b) selectively start fueling the engine.

In further features, once the predetermined mass has flowed into the engine, the engine control module is configured to start fueling the engine after a temperature of the oxygen sensor is greater than a predetermined temperature.

In further features, after the engine control module starts the fueling of the engine, the motor control module is configured to control charging of the battery via the electric motor being driven by the engine.

In further features, the motor control module is configured to charge the battery via the electric motor being driven by the engine until a state of charge of the battery is greater than a predetermined state of charge.

In further features, the motor control module is configured to apply power to the electric motor based on the driver torque request and drive rotation of the crankshaft of the engine when the state of charge of the battery is less than a second predetermined state of charge.

In further features, the predetermined state of charge is one of greater than and equal to the second predetermined state of charge.

In further features, the motor control module is configured to apply power to the electric motor based on the driver torque request and drive rotation of the crankshaft of the engine when the driver torque request is greater than a predetermined torque.

In further features, the engine control module is configured to, once the state of charge of the battery is greater than the predetermined state of charge, deactivate a cylinder of the engine.

In further features, the predetermined mass of air is calibrated based on removing moisture from the oxygen sensor while the crankshaft is rotating without the engine combusting air and fuel.

In further features, the engine control module is configured to determine the predetermined mass based on an air temperature.

In further features, the engine control module is configured to, based on a mass air flowrate, determine a cumulative mass of air that has flowed into the engine while the motor control module is applying power to the electric motor based on the driver torque request and driving rotation of the crankshaft of the engine.

In further features, the engine control module is configured to determine the cumulative mass of air based on mathematical integrals of the mass air flowrate.

In further features, the engine control module is configured to, once the predetermined mass of air has flowed into the engine, (a) apply power to the oxygen sensor and heat the oxygen sensor and (b) selectively start closed loop fueling of the engine based on a stoichiometric air/fuel ratio.

In further features, the motor control module is configured to apply power to the electric motor based on the driver torque request and drive rotation of the crankshaft of the engine based on a predetermined target engine speed.

In a feature, a motor and engine control system for a vehicle includes: a driver torque request module configured to determine a driver torque request based on driver input; a motor control module configured to selectively control application of power from a battery to an electric motor of the vehicle based on the driver torque request; an engine control module configured to selectively actuate actuators of an engine of the vehicle based on the driver torque request, where, when a temperature of an oxygen sensor in an exhaust system of the engine is less than a predetermined temperature while the engine is off and at least one of (a) the driver torque request is greater than a predetermined torque and (b) a state of charge of the battery is less than a predetermined state of charge: (i) the motor control module is configured to apply power to the electric motor based on the driver torque request and drive rotation of a crankshaft of the engine based on a predetermined target speed and the engine control module is configured to not fuel the engine; after (i), (ii) the engine control module is configured to being applying power to an oxygen sensor and heating the oxygen sensor in response to a determination that a predetermined mass of air has flowed into the engine during (i); and after (ii), (iii) the engine control module is configured to start fueling the engine once the predetermined mass of air has flowed into the engine and the motor control module is configured to stop applying power to the electric motor once the fueling is started and charge the battery using the engine and the electric motor; and after (iii), (iv) the engine control module is configured to deactivate a cylinder of the engine in response to a determination that the state of charge of the battery is greater than a second predetermined state of charge.

In a feature, a motor and engine control method for a vehicle includes: determining a driver torque request based on driver input; selectively controlling application of power from a battery to an electric motor of the vehicle based on the driver torque request; selectively actuating actuators of an engine of the vehicle based on the driver torque request, when a temperature of an oxygen sensor in an exhaust system of the engine is less than a predetermined temperature while the engine is off: applying power to the electric motor based on the driver torque request and driving rotation of a crankshaft of the engine; while power to the electric motor is being applied based on the driver torque request and the electric motor is driving rotation of a crankshaft of the engine, not fueling the engine and not applying power to the oxygen sensor until a predetermined mass of air has flowed into the engine; and once the predetermined mass of air has flowed into the engine, (a) applying power to the oxygen sensor and heating the oxygen sensor and (b) selectively starting fueling the engine.

In further features, the selectively starting fueling includes, once the predetermined mass has flowed into the engine, starting fueling the engine after a temperature of the oxygen sensor is greater than a predetermined temperature.

In further features, after the starting of the fueling of the engine, controlling charging of the battery via the electric motor being driven by the engine.

In further features, the controlling charging includes charging the battery via the electric motor being driven by the engine until a state of charge of the battery is greater than a predetermined state of charge.

In further features, the applying power to the electric motor includes applying power to the electric motor based on the driver torque request and driving rotation of the crankshaft of the engine when the state of charge of the battery is less than a second predetermined state of charge.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A hybrid vehicle includes at least one internal combustion engine and at least one electric motor used for propulsion. Emissions of the engine when the engine is started while cold may be higher than during normal operation of the engine and when the engine is started while warm.

The present application involves systems and methods for engine cold starts to decrease engine emissions. An electric motor is used for propulsion while the engine is off. When the engine is to be started, such as when a driver torque request is greater than a predetermined value or a state of charge (SOC) of the battery is less than a predetermined SOC, the electric motor is used to motor the engine. Motoring of the engine (rotating the crankshaft without fueling of the engine, is performed until a predetermined amount of air has flowed into the engine during the motoring of the engine. Once the predetermined amount of air has flowed into the engine during the motor to remove moisture from one or more oxygen sensors, the oxygen sensor(s) is/are powered to generate heat. When the temperature of the oxygen sensor(s) is/are greater than a predetermined temperature, the engine is started including providing fuel and spark to the engine. When the engine is running, the electric motor is used to charge the battery. Once the state of charge of the battery is greater than a predetermined state of charge, one or more cylinders of the engine may be deactivated to reduce fuel consumption of the engine.

The motoring of the engine helps to remove moisture from the oxygen sensor(s) and the aftertreatment system to help achieve a faster catalyst lightoff and adds energy to the exhaust system. The deactivation of one or more cylinders decreases fuel consumption and may avoid more frequent often cold starts of the engine. Waiting to start the engine until after the temperature of the oxygen sensor reaches the predetermined temperature may decrease exhaust emissions as closed loop control of fueling can begin sooner.

Figure 1:
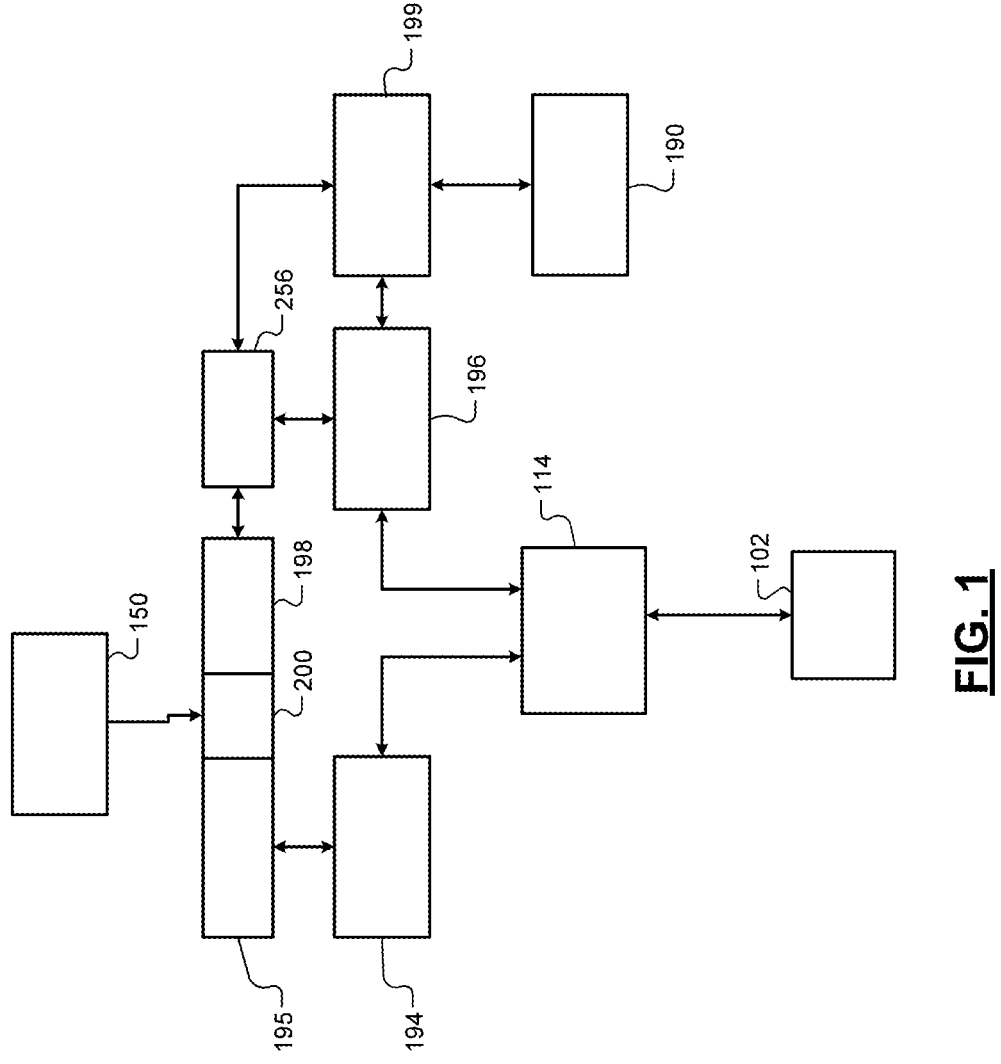
FIG. 1 is a functional block diagram of an example vehicle system.

Referring now to FIG. 1, a functional block diagram of an example vehicle system is presented. While a vehicle system for a hybrid vehicle is shown and will be described, the present application is also applicable to fuel cell vehicles, autonomous vehicles, and other types of vehicles. Also, while the example of a vehicle is provided, the present application is also applicable to non-vehicle implementations.

An engine 102 may combust an air/fuel mixture to generate drive torque. An engine control module (ECM) 114 controls the engine 102. For example, the ECM 114 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (e.g., electric vehicles), the engine 102 may be omitted.

The engine 102 may output torque to a transmission 195. A transmission control module (TCM) 194 controls operation of the transmission 195. For example, the TCM 194 may control gear selection within the transmission 195 and one or more torque transfer devices (e.g., a torque converter, one or more clutches, etc.).

The vehicle system includes one or more electric motors, such as electric motor 198. An electric motor can act as either a generator or as a motor at a given time. When acting as a generator, an electric motor converts mechanical energy into electrical energy. The electrical energy can be, for example, used to charge a battery 199. When acting as a motor, an electric motor generates torque that may be used, for example, for vehicle propulsion. While the example of one electric motor is provided, the vehicle may include more than one electric motor. In various implementations, the electric motor 198 may be used to start the engine 102, such as via a belt.

A motor control module 196 controls power flow from the battery 199 to the electric motor 198 and from the electric motor 198 to the battery 199. The motor control module 196 applies electrical power from the battery 199 to the electric motor 198 to cause the electric motor 198 to output positive torque, such as for vehicle propulsion or to start the engine 102. The battery 199 may include, for example, one or more battery modules. Each battery module may include a plurality of battery cells.

The electric motor 198 may output torque, for example, to an input shaft of the transmission 195 or to an output shaft of the transmission 195, or to a wheel of the vehicle. Two or more clutches, such as clutch 200 may be engaged to couple the electric motor 198 to the transmission 195 and disengaged to decouple the electric motor 198 from different gear sets of the transmission 195. Gear sets may be implemented between an output of the clutch 200 and an input of the transmission 195 to provide two or more predetermined ratios between rotation of the electric motor 198 and rotation of the input of the transmission 195. The transmission 195 may also be referred to as a gear box.

The motor control module 196 may also selectively control the electric motor 198 to convert mechanical energy of the vehicle into electrical energy. More specifically, the electric motor 198 generates and outputs power when the electric motor 198 is being driven by the transmission 195 and the motor control module 196 is not applying power to the electric motor 198 from the battery 199. The motor control module 196 may charge the battery 199 via the power output by the electric motor 198.

The vehicle may include a charge port 190. A power source, such as a charging station, another vehicle, or another suitable source of power may connect to and charge the battery 199 via the charge port 190. The battery 199 may also be used to power other devices (e.g., other vehicles) via the charge port 190.

Figure 2:
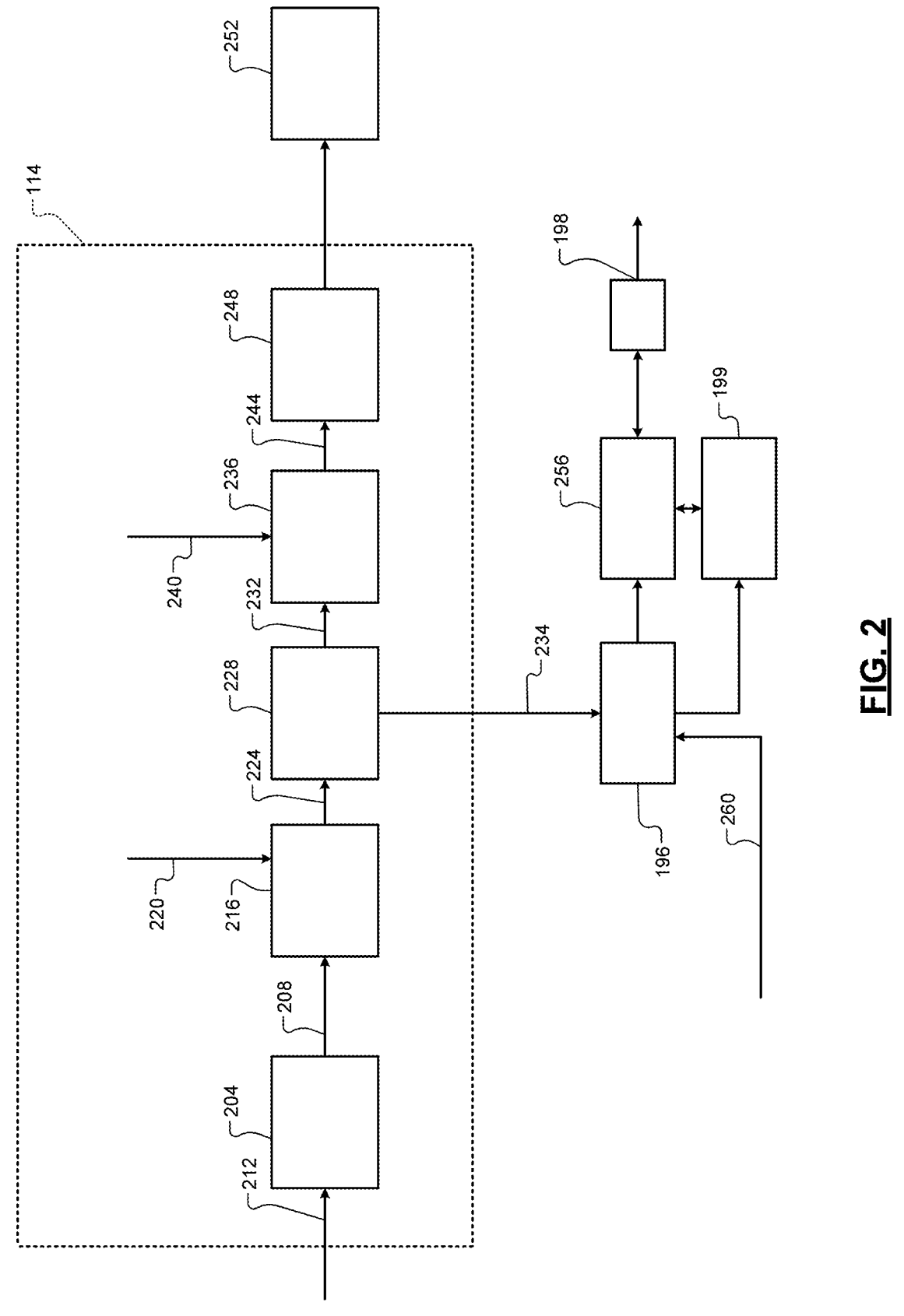
FIG. 2 is a functional block diagram of an example propulsion control system.

Referring now to FIG. 2, a functional block diagram of an example propulsion control system is presented. A driver torque module 204 determines a driver torque request 208 based on driver input 212. The driver input 212 may include, for example, an accelerator pedal position (APP), a brake pedal position (BPP), cruise control input, and/or an autonomous input. In various implementations, the cruise control input may be provided by an adaptive cruise control system that attempts to maintain at least a predetermined distance between the vehicle and objects in a path of the vehicle. The autonomous input may be provided by an autonomous driving system that controls movement of a vehicle from location to location while avoiding objects and other vehicles. The driver torque module 204 determines the driver torque request 208 based on one or more lookup tables that relate the driver inputs to driver torque requests. The APP and BPP may be measured using one or more APP sensors and BPP sensors, respectively.

The driver torque request 208 may be an axle torque request. Axle torques (including axle torque requests) refer to torque at the wheels. As discussed further below, propulsion torques (including propulsion torque requests) are different than axle torques in that propulsion torques may refer to torque at a transmission input shaft.

An axle torque arbitration module 216 arbitrates between the driver torque request 208 and other axle torque requests 220. Axle torque (torque at the wheels) may be produced by various sources including the engine 102 and/or one or more electric motors, such as the electric motor 198. Examples of the other axle torque requests 220 include, but are not limited to, a torque reduction requested by a traction control system when positive wheel slip is detected, a torque increase request to counteract negative wheel slip, brake management requests to reduce axle torque to ensure that the axle torque does not exceed the ability of the brakes to hold the vehicle when the vehicle is stopped, and vehicle over-speed torque requests to reduce the axle torque to prevent the vehicle from exceeding a predetermined speed. The axle torque arbitration module 216 outputs one or more axle torque requests 224 based on the results of arbitrating between the received axle torque requests 208 and 220.

In hybrid vehicles, a hybrid module 228 may determine how much of the one or more axle torque requests 224 should be produced by the engine 102 and how much of the one or more axle torque requests 224 should be produced by the electric motor 198. The example of the electric motor 198 will be continued for simplicity in conjunction with the example of FIG. 2, but multiple electric motors may be included. The hybrid module 228 outputs one or more engine torque requests 232 to a propulsion torque arbitration module 236. The engine torque requests 232 indicate a requested torque output of the engine 102.

The hybrid module 228 also outputs a motor torque request 234 to the motor control module 196. The motor torque request 234 indicates a requested torque output (positive or negative) of the electric motor 198. In vehicles where the engine 102 is omitted (e.g., electric vehicles) or is not connected to output propulsion torque for the vehicle, the axle torque arbitration module 216 may output one axle torque request and the motor torque request 234 may be equal to that axle torque request.

In the example of multiple electric motors, the motor control module 196 may determine how much torque should be produced by each of the electric motors. The electric motors may be controlled to achieve the same or different amounts of torque.

The propulsion torque arbitration module 236 converts the engine torque requests 232 from an axle torque domain (torque at the wheels) into a propulsion torque domain (e.g., torque at an input shaft of the transmission). The propulsion torque arbitration module 236 arbitrates the converted torque requests with other propulsion torque requests 240. Examples of the other propulsion torque requests 240 include, but are not limited to, torque reductions requested for engine over-speed protection and torque increases requested for stall prevention. The propulsion torque arbitration module 236 may output one or more propulsion torque requests 244 as a result of the arbitration.

An actuator control module 248 controls actuators 252 of the engine 102 based on the propulsion torque requests 244. For example, based on the propulsion torque requests 244, the actuator control module 248 may control opening of a throttle valve, timing of spark provided by spark plugs, timing and amount of fuel injected by fuel injectors, cylinder actuation/deactivation, intake and exhaust valve phasing, output of one or more boost devices (e.g., turbochargers, superchargers, etc.), opening of an EGR valve, and/or one or more other engine actuators. In various implementations, the propulsion torque requests 244 may be adjusted or modified before use by the actuator control module 248, such as to create a torque reserve.

The motor control module 196 controls switching of switches of an inverter module 256 based on the motor torque request 234. Switching of the inverter module 256 controls power flow from the battery 199 to the electric motor 198. As such, switching of the inverter module 256 controls torque output of the electric motor 198. The inverter module 256 also converts power generated by the electric motor 198 and outputs power to the battery 199, for example, to charge the battery 199.

The motor control module 196 may control switching of switches of the inverter module 256, for example, based on adjusting a torque 260 output of the electric motor 198 toward or to the motor torque request 234 using a closed loop control module. For example, the closed loop control module may include a proportional integral (PI) control module or another suitable type of closed loop control module. The torque 260 of the electric motor 198 may be measured using a torque sensor or estimated (e.g., by the motor control module 196) based on one or more operating parameters, such as using one or more equations and/or lookup tables.

The inverter module 256 includes the plurality of switches. The motor control module 196 switches the switches to convert DC power from the battery 199 into alternating current (AC) power and to apply the AC power to the electric motor 198 to drive the electric motor 198. For example, the inverter module 256 may convert the DC power from the battery 199 into n-phase AC power and apply the n-phase AC power to (e.g., a, b, and c, or u, v, and w) n stator windings of the electric motor 198. In various implementations, n is equal to 3. Magnetic flux produced via current flow through the stator windings drives a rotor of the electric motor 198. The rotor is connected to and drives rotation of an output shaft of the electric motor 198.

In various implementations, one or more filters may be electrically connected between the inverter module 256 and the battery 199. The one or more filters may be implemented, for example, to filter power flow to and from the battery 199. As an example, a filter including one or more capacitors and resistors may be electrically connected in parallel with the inverter module 256 and the battery 199.

While the battery 199 is discussed in conjunction with the vehicle, the present application is also applicable to uses of the battery 199 in other types of devices including non-vehicle applications.

Figure 3:
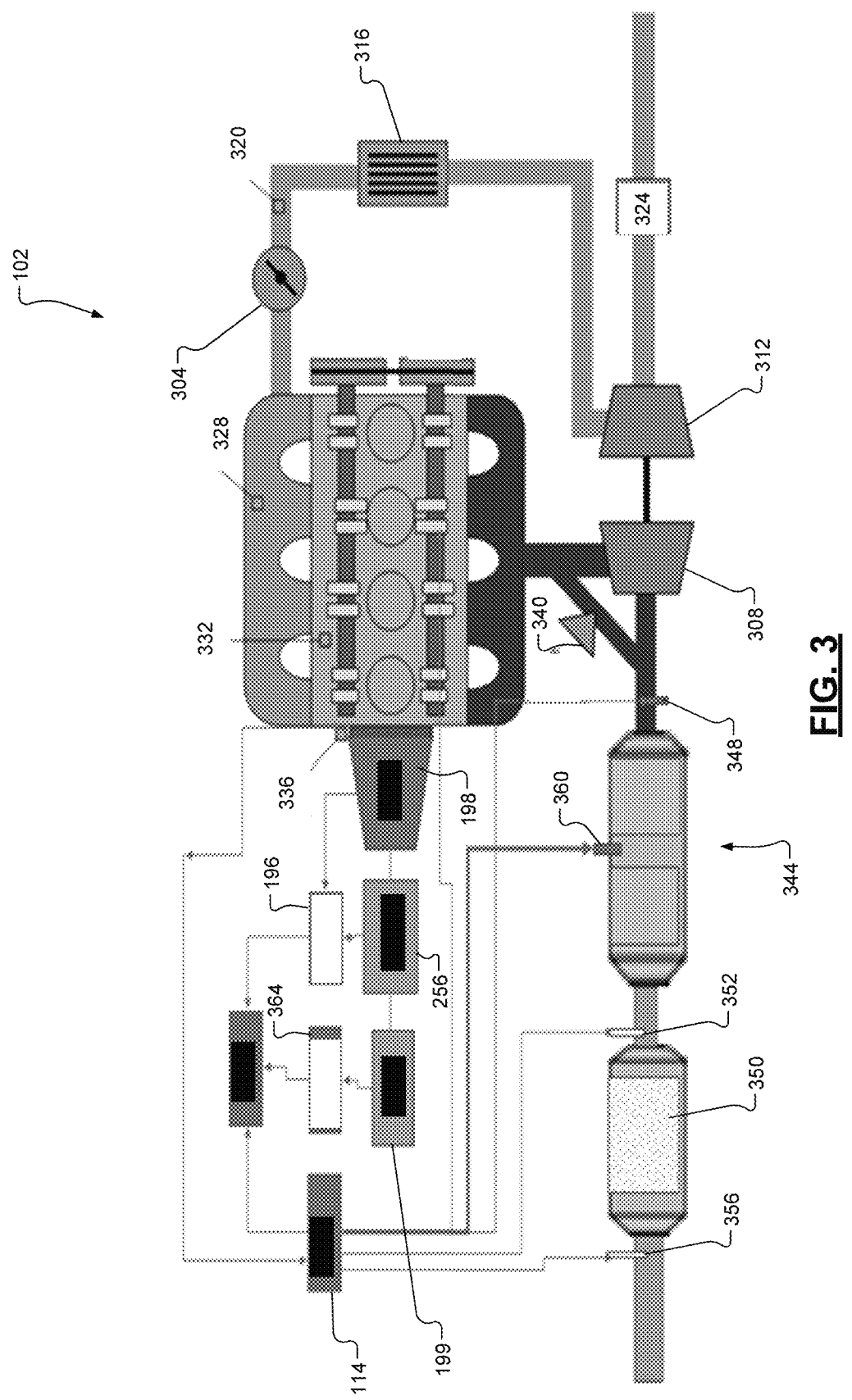
FIG. 3 is a functional block diagram of an example hybrid system.

FIG. 3 is a functional block diagram of an example hybrid system. Air flows into the engine 102 through a throttle valve 304. Air and fuel is combusted within cylinders of the engine 102 to produce torque.

A turbocharger including a turbine 308 and an impeller 312 may increase airflow into the engine 102. Exhaust output by the engine drives rotation of the turbine 308. Rotation of the turbine 308 drives rotation of the impeller 312, and rotation of the impeller 312 increases airflow into the engine 102. An air cooler 316 may be implemented and cool air flowing into the engine 102. A throttle inlet air pressure (TIAP) sensor 320 may measure a pressure of air at an inlet of the throttle valve 304. A mass airflow (MAF) sensor measures a mass flowrate of air into the engine 102. A barometric pressure sensor measures a barometric air pressure. An intake air temperature sensor measures a temperature of air flowing into the engine. The MAF sensor, the barometric pressure sensor, and the intake air temperature sensor are collectively illustrated by 324.

A manifold absolute pressure (MAP) sensor 328 measures a pressure of air in an intake manifold of the engine 102. A coolant temperature sensor 332 measures a temperature of engine coolant within the engine 102. An engine speed sensor 336 measures a rotational speed of a crankshaft of the engine 102.

The engine 102 outputs exhaust to an exhaust system. A wastegate 340 may regulate exhaust gas bypassing the turbine 308.

The exhaust may flow through one or more three way catalysts (TWCs), such as 344. A first oxygen sensor 348 may measure an amount (e.g., concentration) of oxygen in the exhaust flowing into the TWC(s) 344. Exhaust output from the TWC(s) 344 may flow into a gasoline particulate filter (GPF) 350. Temperature sensors 352 and 356 may measure temperatures of the exhaust upstream and downstream, respectively, of the GPF 350. A second oxygen sensor 360 may measure an amount (e.g., concentration) of oxygen at a point between two TWCs. The first and second oxygen sensors 348 and 350 may also measure their respective temperatures.

A battery management module 364 may determine one or more parameters of the battery 199. For example, the battery management module 364 may determine a state of charge (SOC) of the battery 199 based on current flow to and from the battery 199, a voltage of the battery 199, etc. The battery management module 364 may determine the SOC of the battery 199 using one or more equations or lookup tables, such as coulomb counting. The battery management module 364 may control one or more aspects of the battery 199, such as charging and/or discharging.

Figure 4:
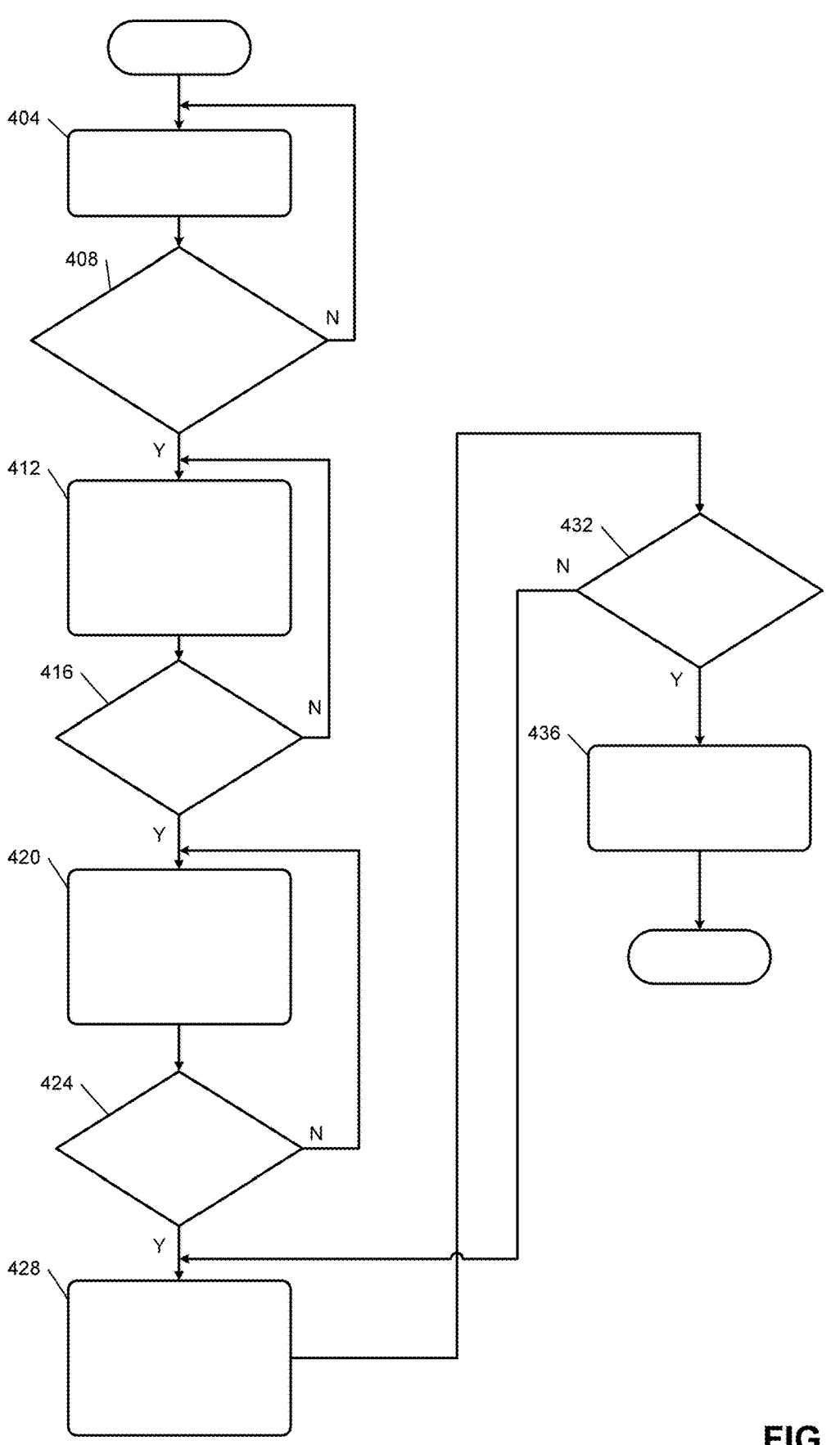
FIG. 4 is a flowchart depicting an example method of controlling a startup of the engine when the engine temperature is less than a predetermined cold start temperature.

FIG. 4 is a flowchart depicting an example method of controlling a startup of the engine 102 when the engine temperature (e.g., the coolant temperature measured by the coolant temperature sensor 332) is less than a predetermined cold start temperature.

At 404, the motor control module 196 controls application of power to the electric motor 198 based on the driver torque request 208 (more specifically the motor torque request 234) to use the electric motor 198 for propulsion of the vehicle. Concurrently the engine control module 114 leaves the engine 102 off with the crankshaft not rotating. A clutch control module 150 (FIG. 1) may actuate one or more clutches and decouple the engine 102 from the electric motor 198, thereby allowing the electric motor 198 to be used for propulsion while allowing the crankshaft to not be driven.

At 408, the engine control module 114 determines whether to start the engine 102, such as whether the SOC of the battery 199 is less than a predetermined SOC and/or the driver torque request 208 is greater than a predetermined torque. The predetermined SOC may be, for example, 70 percent SOC or another suitable value. The predetermined torque may be, for example, approximately 70 percent of a maximum torque output of the electric motor 198 or another suitable value. If 408 is true, control continues with 412. If 408 is false, control may return to 404 and continue using the electric motor 198 for propulsion.

At 412, the motor control module 196 controls application of power to the electric motor 198 based on the driver torque request 208 (more specifically the motor torque request 234) for propulsion and to rotate the crankshaft of the engine 102 at a predetermined target speed. The clutch control module 150 may actuate one or more clutches and couple the engine 102 with the electric motor 198, thereby allowing the electric motor 198 to be used for propulsion and to drive rotation of the crankshaft. The engine control module 114 does not fuel the engine 102 at 412 and may not provide spark to the engine 102 at 412. The engine control module 114 may open the wastegate 340 to allow air to bypass the turbocharger. Also at 412, the engine control module 114 determines a mass of air that has flowed into the engine 102, such as based on the MAF measured by the MAF sensor 324 or an estimated mass air flowrate. The engine control module 114 may, for example, determine a mathematical integral of the last two MAF samples over the period between the taking of the two MAF samples to determine the mass of air that flowed into the engine 102 over the period. The engine control module 114 also updates a cumulative mass of air that has flowed into the engine 102 since the first instance of 412 (since the rotation of the crankshaft without fueling began) based on the mass. The engine control module 114 may, for example, set the cumulative mass based on or equal to the last value of the cumulative mass of air plus the mass of air determined at that instance of 412.

At 416, the engine control module 114 may determine whether the cumulative mass of air that has flowed into the engine 102 is greater than or equal to a predetermined mass. The predetermined mass may correspond to a mass of air to remove moisture from the oxygen sensors 348 and 360. The predetermined mass may be a fixed predetermined value or may be set by the engine control module 114, for example, based on ambient air temperature and/or the barometric pressure. The engine control module 114 may determine the predetermined mass for example using one or more equations and/or lookup tables. If 416 is true, control continues with 420. If 416 is false, control returns to 412 to continue rotating the crankshaft (motoring the engine 102) and updating the cumulative mass of air.

At 420, the engine control module 114 applies power to the oxygen sensors 348 and 360 to heat the sensing elements of the oxygen sensors 348 and 360. The motor control module 196 continues to control application of power to the electric motor 198 based on the driver torque request 208 (more specifically the motor torque request 234) for propulsion and to rotate the crankshaft of the engine 102 at the predetermined target speed. The engine control module 114 does not fuel the engine 102 at 412 and may not provide spark to the engine 102.

At 424, the engine control module 114 determines whether the temperatures of the oxygen sensors 348 and 360 (measured by the oxygen sensors 348 and 360) are greater than a predetermined temperature. The amounts of oxygen measured by the oxygen sensors 348 and 360 may be accurate when the temperatures of the oxygen sensors 348 and 360 are greater than or equal to the predetermined temperature. The predetermined temperature may be, for example, approximately 150 degrees Fahrenheit or another suitable temperature. If 424 is true, control continues with 428. If 424 is false, control returns to 420 to continue warming the oxygen sensors 348 and 360 while motoring the engine 102.

At 428, the engine control module 114 starts the engine 102 including fueling the engine 102 (e.g., based on achieving a stoichiometric air/fuel ratio) and providing spark to the engine 102 to combust the air/fuel mixture. The motor control module 196 may stop applying power to the electric motor 198 at 428 and use the electric motor 198 for power generation to charge the battery 199. At 428, the engine control module 114 may control the engine actuators based on achieving the driver torque request 208 for propulsion and generating power using the electric motor 198 to charge the battery 199. The motor control module 196 may determine the present SOC of the battery 199.

At 432, the engine control module 114 determines whether the present SOC of the battery 199 is greater than the predetermined value. The predetermined value may be the same or higher than the predetermined value of 408. The predetermined value may be, for example, approximately 70 percent SOC or another suitable value. If 432 is true, control continues with 436. If 432 is false, control returns to 428 to continue running the engine 102. At 436 the engine control module 114 may deactivate one or more cylinders of the engine 102 while achieving the driver torque request 208.

For example, the engine control module 114 may determine an active number of cylinders operating at maximum efficiency and torque output to achieve the driver torque request 208 and deactivate a number of cylinders equal to the total number of cylinders of the engine 102 minus the number of cylinders to achieve the driver torque request 208. Deactivating a cylinder may include the engine control module 114 not providing fueling and spark to the cylinder. The engine control module 114 may maintain intake and exhaust valves of the cylinder closed throughout each combustion cycle of the cylinder.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, between circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A motor and engine control system for a vehicle, comprising:

a driver torque request module configured to determine a driver torque request based on driver input;

a motor control module configured to selectively control application of power from a battery to an electric motor of the vehicle based on the driver torque request;

an engine control module configured to selectively actuate actuators of an engine of the vehicle based on the driver torque request, wherein, when a temperature of an oxygen sensor in an exhaust system of the engine is less than a predetermined temperature while the engine is off:

the motor control module is configured to apply power to the electric motor based on the driver torque request and drive rotation of a crankshaft of the engine;

the engine control module is configured to, while the motor control module is applying power to the electric motor based on the driver torque request and driving rotation of the crankshaft of the engine, not fuel the engine and not apply power to the oxygen sensor until a predetermined mass of air has flowed into the engine; and once the predetermined mass of air has flowed into the engine, the engine control module is configured to (a) apply power to the oxygen sensor and heat the oxygen sensor and (b) selectively start fueling the engine.

2. The system of claim 1 wherein, once the predetermined mass has flowed into the engine, the engine control module is configured to start fueling the engine after a temperature of the oxygen sensor is greater than a predetermined temperature.

3. The system of claim 1 wherein, after the engine control module starts the fueling of the engine, the motor control module is configured to control charging of the battery via the electric motor being driven by the engine.

4. The system of claim 3 wherein the motor control module is configured to charge the battery via the electric motor being driven by the engine until a state of charge of the battery is greater than a predetermined state of charge.

5. The system of claim 4 wherein the motor control module is configured to apply power to the electric motor based on the driver torque request and drive rotation of the crankshaft of the engine when the state of charge of the battery is less than a second predetermined state of charge.

6. The system of claim 5 wherein the predetermined state of charge is one of greater than and equal to the second predetermined state of charge.

7. The system of claim 4 wherein the motor control module is configured to apply power to the electric motor based on the driver torque request and drive rotation of the crankshaft of the engine when the driver torque request is greater than a predetermined torque.

8. The system of claim 4 wherein the engine control module is configured to, once the state of charge of the battery is greater than the predetermined state of charge, deactivate a cylinder of the engine.

9. The system of claim 1 wherein the predetermined mass of air is calibrated based on removing moisture from the oxygen sensor while the crankshaft is rotating without the engine combusting air and fuel.

10. The system of claim 1 wherein the engine control module is configured to determine the predetermined mass based on an air temperature.

11. The system of claim 1 wherein the engine control module is configured to, based on a mass air flowrate, determine a cumulative mass of air that has flowed into the engine while the motor control module is applying power to the electric motor based on the driver torque request and driving rotation of the crankshaft of the engine.

12. The system of claim 11 wherein the engine control module is configured to determine the cumulative mass of air based on mathematical integrals of the mass air flowrate.

13. The system of claim 1 wherein the engine control module is configured to, once the predetermined mass of air has flowed into the engine, (a) apply power to the oxygen sensor and heat the oxygen sensor and (b) selectively start closed loop fueling of the engine based on a stoichiometric air/fuel ratio.

14. The system of claim 1 wherein the motor control module is configured to apply power to the electric motor based on the driver torque request and drive rotation of the crankshaft of the engine based on a predetermined target engine speed.

15. A motor and engine control system for a vehicle, comprising:

a driver torque request module configured to determine a driver torque request based on driver input;

a motor control module configured to selectively control application of power from a battery to an electric motor of the vehicle based on the driver torque request;

an engine control module configured to selectively actuate actuators of an engine of the vehicle based on the driver torque request, wherein, when a temperature of an oxygen sensor in an exhaust system of the engine is less than a predetermined temperature while the engine is off and at least one of (a) the driver torque request is greater than a predetermined torque and (b) a state of charge of the battery is less than a predetermined state of charge:

(i) the motor control module is configured to apply power to the electric motor based on the driver torque request and drive rotation of a crankshaft of the engine based on a predetermined target speed and the engine control module is configured to not fuel the engine;

after (i), (ii) the engine control module is configured to being applying power to an oxygen sensor and heating the oxygen sensor in response to a determination that a predetermined mass of air has flowed into the engine during (i); and after (ii), (iii) the engine control module is configured to start fueling the engine once the predetermined mass of air has flowed into the engine and the motor control module is configured to stop applying power to the electric motor once the fueling is started and charge the battery using the engine and the electric motor; and after (iii), (iv) the engine control module is configured to deactivate a cylinder of the engine in response to a determination that the state of charge of the battery is greater than a second predetermined state of charge.

16. A motor and engine control method for a vehicle, comprising:

determining a driver torque request based on driver input;

selectively controlling application of power from a battery to an electric motor of the vehicle based on the driver torque request;

selectively actuating actuators of an engine of the vehicle based on the driver torque request, determining that a temperature of an oxygen sensor in an exhaust system of the engine is less than a predetermined temperature while the engine is off and, in response to the determination that the temperature of the oxygen sensor in the exhaust system of the engine is less than the predetermined temperature while the engine is off:

applying power to the electric motor based on the driver torque request and driving rotation of a crankshaft of the engine;

while power to the electric motor is being applied based on the driver torque request and the electric motor is driving rotation of a crankshaft of the engine, not fueling the engine and not applying power to the oxygen sensor until a predetermined mass of air has flowed into the engine; and once the predetermined mass of air has flowed into the engine, (a) applying power to the oxygen sensor and heating the oxygen sensor and (b) selectively starting fueling the engine.

17. The method of claim 16 wherein the selectively starting fueling includes, once the predetermined mass has flowed into the engine, starting fueling the engine after a temperature of the oxygen sensor is greater than a predetermined temperature.

18. The method of claim 16 further comprising, after the starting of the fueling of the engine, controlling charging of the battery via the electric motor being driven by the engine.

19. The method of claim 18 wherein the controlling charging includes charging the battery via the electric motor being driven by the engine until a state of charge of the battery is greater than a predetermined state of charge.

20. The method of claim 19 wherein the applying power to the electric motor includes applying power to the electric motor based on the driver torque request and driving rotation of the crankshaft of the engine when the state of charge of the battery is less than a second predetermined state of charge.

* * * * *